United States Patent
Schwantes (10) Patent No.: US 8,455,098 B2
(45) Date of Patent: Jun. 4, 2013

(54) ENCAPSULATED SOLID HYDROPHILIC PARTICLES

(75) Inventor: Todd Arlin Schwantes, Lena, WI (US)

(73) Assignee: Appleton Papers Inc., Appleton, WI (US)

( * ) Notice: Subject to any disclaimer, the term of this patent is extended or adjusted under 35 U.S.C. 154(b) by 383 days.

(21) Appl. No.: 12/754,900

(22) Filed: Apr. 6, 2010

(65) Prior Publication Data
US 2010/0255309 A1    Oct. 7, 2010

Related U.S. Application Data

(60) Provisional application No. 61/167,336, filed on Apr. 7, 2009.

(51) Int. Cl.
*B01J 13/14* (2006.01)
*B32B 15/02* (2006.01)

(52) U.S. Cl.
USPC .... 428/402; 428/402.24; 264/4.7; 427/213.3; 427/213.32; 427/213.33; 427/222

(58) Field of Classification Search
USPC ............. 428/402, 402.24; 427/213.3, 213.32, 427/213.33, 222; 264/4.7
See application file for complete search history.

(56) References Cited

U.S. PATENT DOCUMENTS

| | | | | |
|---|---|---|---|---|
| 2,730,456 A * | 1/1956 | Green et al. | 503/214 |
| 2,800,457 A * | 7/1957 | Green et al. | 428/402.2 |
| 2,800,458 A * | 7/1957 | Green | 428/402.2 |
| 3,516,941 A * | 6/1970 | Matson | 264/4.33 |
| 3,660,304 A * | 5/1972 | Matsukawa | 264/4.3 |
| 3,886,085 A * | 5/1975 | Kiritani et al. | 428/402.21 |
| 3,965,033 A * | 6/1976 | Matsukawa et al. | 264/4.3 |
| 4,001,140 A * | 1/1977 | Foris et al. | 427/213.34 |
| 4,087,376 A * | 5/1978 | Foris et al. | 427/213.34 |
| 4,089,802 A * | 5/1978 | Foris et al. | 427/213.34 |
| 4,093,556 A * | 6/1978 | Wojciak | 427/213.34 |
| 4,100,103 A * | 7/1978 | Foris et al. | 427/213.34 |
| 4,166,152 A * | 8/1979 | Baker et al. | 428/522 |
| 4,197,346 A * | 4/1980 | Stevens | 503/212 |
| 4,221,710 A * | 9/1980 | Hoshi et al. | 503/215 |
| 4,251,386 A * | 2/1981 | Saeki et al. | 264/4.7 |
| 4,285,720 A * | 8/1981 | Scher | 504/112 |
| 4,356,109 A * | 10/1982 | Saeki et al. | 264/4.1 |
| 4,444,699 A * | 4/1984 | Hayford | 264/4.7 |
| 4,547,429 A * | 10/1985 | Greiner et al. | 428/402.24 |
| 4,552,811 A * | 11/1985 | Brown et al. | 428/402.21 |
| 4,588,639 A * | 5/1986 | Ozono | 428/402.22 |
| 4,601,863 A * | 7/1986 | Shioi et al. | 264/4.3 |
| 4,610,927 A * | 9/1986 | Igarashi et al. | 428/402.21 |
| 4,622,267 A * | 11/1986 | Riecke | 428/402.21 |
| 4,708,924 A * | 11/1987 | Nagai et al. | 430/110.2 |
| 5,105,823 A * | 4/1992 | Blum | 600/567 |
| 5,292,835 A * | 3/1994 | Jahns et al. | 526/73 |
| 5,407,609 A * | 4/1995 | Tice et al. | 264/4.6 |
| 5,596,051 A * | 1/1997 | Jahns et al. | 526/73 |
| 6,288,170 B1* | 9/2001 | Waid | 525/113 |
| 6,375,872 B1* | 4/2002 | Chao | 264/4.33 |
| 6,531,156 B1* | 3/2003 | Clark et al. | 424/489 |
| 6,592,990 B2* | 7/2003 | Schwantes | 428/402.21 |
| 2006/0263519 A1* | 11/2006 | Schwantes et al. | 427/213.3 |
| 2008/0317795 A1* | 12/2008 | Traynor et al. | 424/401 |
| 2009/0274905 A1* | 11/2009 | Schwantes | 428/402 |

* cited by examiner

*Primary Examiner* — Irina S Zemel
(74) *Attorney, Agent, or Firm* — Benjamin Mieliulis (57) ABSTRACT

A process of forming a population of microcapsules is described comprising a solid hydrophilic core material and a wall material at least partially surrounding the core material. The microcapsule population is formed by providing an anionic, or optionally a cationic, solid hydrophilic core material; providing an oil continuous phase which is low boiling and preferably nonflammable, the oil continuous phase comprising one or more esters with chain length up to about 18 carbons. A mixture is formed by dispersing the solid hydrophilic material in the oil continuous phase. Either an oil soluble or dispersible amine acrylate or methacrylate, along with acid, or alternatively acid acrylate or methacrylate along with base is added. A multifunctional acrylate or methacrylate monomer or oligomer is provided and an initiator. Optionally a surfactant is also added to form the mixture. Emulsification is achieved by subjecting the mixture to high shear agitation and heating the mixture for a time sufficient to enable the acid or amine acrylate or methacrylate and the multifunctional acrylate or methacrylate to form a prepolymer which migrates to the anionic or cationic solid hydrophilic material, thereby forming prepolymers adhered to the hydrophilic core materials. Temperature is held or heating continued for a time sufficient to enable the prepolymer to flow onto and coalesce into a continuous film surface coating on the hydrophilic core material. Heating is carried out or light exposure or both for a time and temperature sufficient to cross link the prepolymers.

20 Claims, 1 Drawing Sheet

US 8,455,098 B2

ENCAPSULATED SOLID HYDROPHILIC PARTICLES

This application under 35 USC §111(a) claims benefit per 35 USC §119(e) to application Ser. No. 61/167,336 filed Apr. 7, 2009 as a provisional application per 35 USC §111(b)

FIELD OF THE INVENTION

This invention relates to capsule manufacturing processes and microcapsules produced by such processes.

DESCRIPTION OF THE RELATED ART

Various processes for microencapsulation, and exemplary methods and materials are set forth in Schwantes (U.S. Pat. No. 6,592,990), Nagai et. al. (U.S. Pat. No. 4,708,924), Baker et. al. (U.S. Pat. No. 4,166,152), Wojciak (U.S. Pat. No. 4,093,556), Matsukawa et. al. (U.S. Pat. No. 3,965,033), Matsukawa (U.S. Pat. No. 3,660,304), Ozono (U.S. Pat. No. 4,588,639), Irgarashi et. al. (U.S. Pat. No. 4,610,927), Brown et. al. (U.S. Pat. No. 4,552,811), Scher (U.S. Pat. No. 4,285,720), Shioi et. al. (U.S. Pat. No. 4,601,863), Kiritani et. al. (U.S. Pat. No. 3,886,085), Jahns et. al. (U.S. Pat. Nos. 5,596,051 and 5,292,835), Matson (U.S. Pat. No. 3,516,941), Chao (U.S. Pat. No. 6,375,872), Foris et. al. (U.S. Pat. Nos. 4,001,140; 4,087,376; 4,089,802 and 4,100,103), Greene et. al. (U.S. Pat. Nos. 2,800,458; 2,800,457 and 2,730,456), Clark (U.S. Pat. No. 6,531,156), Saeki et. al. (U.S. Pat. Nos. 4,251,386 and 4,356,109), Hoshi et. al. (U.S. Pat. No. 4,221,710), Hayford (U.S. Pat. No. 4,444,699), Hasler et. al. (U.S. Pat. No. 5,105,823), Stevens (U.S. Pat. No. 4,197,346), Riecke (U.S. Pat. No. 4,622,267), Greiner et. al. (U.S. Pat. No. 4,547,429), and Tice et. al. (U.S. Pat. No. 5,407,609), among others and as taught by Herbig in the chapter entitled "Microencapsulation" in Kirk-Othmer Encyclopedia of Chemical Technology, V.16, pages 438-463.

More particularly, U.S. Pat. Nos. 2,730,456; 2,800,457; and 2,800,458 describe methods for capsule formation. Other useful methods for microcapsule manufacture are: U.S. Pat. Nos. 4,001,140; 4,081,376 and 4,089,802 describing a reaction between urea and formaldehyde; U.S. Pat. No. 4,100,103 describing reaction between melamine and formaldehyde; British Pat. No. 2,062,570 describing a process for producing microcapsules having walls produced by polymerization of melamine and formaldehyde in the presence of a styrene-sulfonic acid. Forming microcapsules from urea-formaldehyde resin and/or melamine formaldehyde resin is disclosed in U.S. Pat. Nos. 4,001,140; 4,081,376, 4,089,802; 4,100,103; 4,105,823; and 4,444,699. Alkyl acrylate-acrylic acid copolymer capsules are taught in U.S. Pat. No. 4,552,811. Each patent described throughout this application is incorporated herein by reference to the extent each provides guidance regarding microencapsulation processes and materials.

Interfacial polymerization is a process wherein a microcapsule wall of a polyamide, an epoxy resin, a polyurethane, a polyurea or the like is formed at an interface between two phases. U.S. Pat. No. 4,622,267 discloses an interfacial polymerization technique for preparation of microcapsules. The core material is initially dissolved in a solvent and an aliphatic diisocyanate soluble in the solvent mixture is added. Subsequently, a nonsolvent for the aliphatic diisocyanate is added until the turbidity point is just barely reached. This organic phase is then emulsified in an aqueous solution, and a reactive amine is added to the aqueous phase. The amine diffuses to the interface, where it reacts with the diisocyanate to form polymeric polyurethane shells. A similar technique, used to encapsulate salts which are sparingly soluble in water in polyurethane shells, is disclosed in U.S. Pat. Nos. 4,547,429. 3,516,941 teaches polymerization reactions in which the material to be encapsulated, or core material, is dissolved in an organic, hydrophobic oil phase which is dispersed in an aqueous phase. The aqueous phase has dissolved materials forming aminoplast resin which upon polymerization form the wall of the microcapsule. A dispersion of fine oil droplets is prepared using high shear agitation. Addition of an acid catalyst initiates the polycondensation forming the aminoplast resin within the aqueous phase, resulting in the formation of an aminoplast polymer which is insoluble in both phases. As the polymerization advances, the aminoplast polymer separates from the aqueous phase and deposits on the surface of the dispersed droplets of the oil phase to form a capsule wall at the interface of the two phases, thus encapsulating the core material. Urea-formaldehyde (UF), urea-resorcinol-formaldehyde (URF), urea-melamine-formaldehyde (UMF), and melamine-formaldehyde (MF), capsule formations proceed in such manner.

In interfacial polymerization, the materials to form the capsule wall are in separate phases, one in an aqueous phase and the other in a fill phase. Polymerization occurs at the phase boundary. Thus, a polymeric capsule shell wall forms at the interface of the two phases thereby encapsulating the core material. Wall formation of polyester, polyamide, and polyurea capsules typically proceeds via interfacial polymerization.

Jans et al., U.S. Pat. No. 5,292,835 teaches polymerizing esters of acrylic acid or methacrylic acid with polyfunctional monomers. Specifically illustrated are reactions of polyvinylpyrrolidone with acrylates such as butanediol diacrylate or methylmethacrylate together with a free radical initiator to form capsules surrounding an oil core.

Common micro encapsulation processes can be viewed as a series of steps. First, the core material which is to be encapsulated typically on oil is emulsified or dispersed in a suitable dispersion medium. This medium is typically aqueous but involves the formation of a polymer rich phase. Most frequently, this medium is a solution of the intended capsule wall material. The solvent characteristics of the medium are changed such as to cause phase separation of the wall material. The wall material is thereby contained in a liquid phase which is also dispersed in the same medium as the intended capsule core material. The liquid wall material phase deposits itself as a continuous coating about the dispersed droplets of the emulsified oil.

In the present invention the core is typically solid, and more particularly a solid, especially at room temperature, and constituting a solid hydrophilic material.

Many solid hydrophilic materials are water sensitive. Sunol et al. U.S. Patent Application 20070289720 at the University of South Florida describes a self heating chemical system based on solid water sensitive particles involving calcium oxide, zeolite and citric acid physically separated from water which then undergo an exothermine reaction when a pouch containing water is ruptured.

Wheeler et al., U.S. Patent Application 20080304447 describe time delayed activation of zeolite heating wherein zeolite particles are coated with molten polyethylene, melted waxes or molten sucrose octyl stearate. Such coated particles when contacted with water yield a time delayed heat release cosmetic or facial cleanser.

Zeolites are useful solid hydrophilic materials. Zeolites have the property to attract (adsorb) water vapor and to incorporate it in its internal crystal lattice while releasing heat at the same time. If this process proceeds in an evacuated (airless) environment the attraction of water by the zeolite is so forceful that the internal pressure drops dramatically. The remaining water in an attached vessel evaporates, cools down and freezes immediately due to the heat of evaporation. The resulting ice can be used for cooling and air conditioning while the simultaneously produced heat of adsorption within the zeolite tank can be utilized for heating. If a valve is included between the two vessels, the heat or cold production can be interrupted for any periods without loss of energy.

Zeolite is a general term for natural or synthetic stone like materials which consist of crystalline metal-alumo-silicates with a large internal surface area of up to 1000 $m^2/g$, strong electrostatic fields in the crystal lattice and with a volumetric density of about 0.8 $kg/dm^3$. Zeolites are useful as molecular sieves, as adsorbents, as catalysts in cracking of hydrocarbons in the pretro-chemical industry, as a filler component in paper production, as an ion exchange material in detergents, in adiabatic cooling or heating, fillers in cosmetics, and additives in soaps.

Zeolites are tetrahedras consisting of four oxygen anions and one centrally positioned silicon or aluminum cation. Zeolites are classified according to the various tetrahedral frameworks formed by these basic building blocks. Aluminum and silicon atoms are positioned at junctions while oxygen atoms form bridges between tetrahedras. The difference in electrochemical charges between the aluminum and silicon atoms per one aluminum atom results in a non-compensated negative charge. The balance is restored by metal cations which occupy preferred positions. Because of the strong local electrical dipole moment in the lattice framework, zeolites adsorb polar and non-polar molecules that will fit into their specific framework. This adsorption process is accompanied by release of heat, the heat of adsorption.

Microencapsulating zeolites can provide advantages in terms of control of rate of contact with water and control in rate of heating or as Wheeler et al., describe prolonging the sensation of heating such as in an applied cosmetic or lotion. The microcapsule wall material can be selected to be selectively permeable, nonpermeable, porous, semi-porous, have osmotic character, water soluble, water disintegratable, or water fracturable. With optionally a water permeable or a water soluble wall material, the degree of water solubility or permeance can be advantageously adapted to provide a desired rate of water contact with the encapsulated solid hydrophilic material.

Although encapsulation of various materials is known in the art, a need persists for techniques to coat solid hydrophilic core materials. Although rotary coaters and fluidized bed processes exist, such processes tend to be coarse, throwing coating onto particles or melt blending particles as compared to coacervation, interfacial or solution deposition methods of capsule formation.

Where consistency of wall thickness, uniform deposition, engineering of the wall chemistry, control of release rates, control of charge characteristics, uniform layering, and the like properties are important, the techniques and compositions of the present invention provide a novel process and chemistry to achieve forming a population of microcapsules with an ionic wall material at least partially surrounding a solid hydrophilic core material.

SUMMARY OF THE INVENTION

The present invention discloses a process of forming a population of microcapsules comprising particles of a solid hydrophilic core material and a wall material at least partially surrounding the core material, the microcapsule population being formed by providing a solid hydrophilic core material; providing an oil continuous phase which is low boiling and preferably nonflammable, the oil continuous phase comprising one or more hydrocarbons with chain length up to about 18 carbons; forming a mixture by adding an oil soluble or dispersible amine acrylate or methacrylate; adding a multifunctional acrylate or methacrylate monomer or oligomer; adding an acid and an initiator; optionally adding a surfactant; dispersing the mixture by subjecting the mixture to agitation; heating the mixture for a time sufficient to enable the amine acrylate or methacrylate and the multifunctional acrylate or methacrylate to form a cationic prepolymer; dispersing the solid hydrophilic material in the oil continuous phase whereby the cationic prepolymer migrates to the solid hydrophilic material, thereby forming prepolymer adhered to the hydrophilic core materials; holding the temperature for a time sufficient to enable the cationic prepolymer to flow onto and coalesce into a continuous film surface coating on the hydrophilic core material; and heating for a time and temperature sufficient to cross link the prepolymers. For purposes hereof, "holding the temperature" means that heating is continued and the temperature maintained within about 5° C. or even 10° C. plus or minus, preferably within 20° C. plus or minus, or even about 25° C. to 30° C. plus or minus the preceding heating step.

In a further embodiment, the present invention comprises a process for forming a population of microcapsules comprising a solid hydrophilic core material and a wall material at least partially surrounding the core material, the microcapsule population being formed by providing particles of a solid hydrophilic core material; providing an oil continuous phase which is low boiling and preferably nonflammable, the oil continuous phase comprising one or more hydrocarbons with chain length up to about 18 carbons; dividing the oil continuous phase into oil 1 and oil 2; dispersing into oil 1 an initiator; dispersing into oil 2 a multifunctional acrylate or methacrylate monomer or oligomer, and an oil soluble or dispersible amine acrylate or methacrylate, and an acid; subjecting oil 1 to one or more heating steps; combining oil 1 and oil 2; subjecting the combined oils to one or more heating steps, forming a cationic wall prepolymer; forming a mixture by dispersing the solid hydrophilic material into the oil continuous phase and mixing for a sufficient time to allow the wall prepolymer to migrate to and deposit onto the solid hydrophilic core material particles; optionally adding a surfactant; holding the temperature for a time sufficient to enable the cationic prepolymer to flow onto and coalesce into a continuous film surface coating on the hydrophilic core material; and heating the mixture for a time sufficient to cross-link the deposited prepolymer continuous film on the surface of the particles.

In either of the above embodiments, preferably the acid and amine acrylate or methacrylate have a percent by weight as compared to weight of the wall material of from 0.1 to 10 or even 25 percent, and/or have a molar proportion of from 1.25/1 to about 1/1.25, or even 1.5/1 to about 1/1.5.

The solid hydrophilic core material is optionally selected from the group consisting of anionic, cationic, or neutral but polar material.

Preferably in any of the embodiments disclosed herein the amine acrylate or methacrylate is selected from a monofunctional amine acrylate or a monofunctional amine methacrylate with a nitrogen content of 5% by weight or greater. Alternatively, the amine acrylate is selected from the group consisting of alkyl amino acrylate and alkylaminomethacrylate having a nitrogen content of 5% by weight or greater.

In yet a further embodiment, in the processes of the invention the acid can be selected to be a carboxylic acid acrylate or carboxylic acid methacrylate having a —COOH content of 20% or greater by weight.

In another embodiment, the present invention discloses a process of forming a population of microcapsules comprising a hydrophilic solid core material and a wall material at least partially surrounding the core material, the microcapsule population being formed by providing particles of a solid hydrophilic core material; providing an oil continuous phase which is low boiling and preferably nonflammable, the oil continuous phase comprising one or more hydrocarbons with chain length up to about 18 carbons; forming a mixture by adding an oil soluble or dispersible acid acrylate or methacrylate; adding a multifunctional acrylate or methacrylate monomer or oligomer; adding a base and an initiator; optionally adding a surfactant; dispersing the mixture by subjecting the mixture to high shear agitation; heating the mixture for a time sufficient to enable the acid acrylate or methacrylate and the multifunctional acrylate or methacrylate to form an anionic prepolymer; dispersing the solid hydrophilic material in the oil continuous phase whereby the anionic prepolymer migrates to and deposits onto a surface of the solid hydrophilic material, thereby forming prepolymer adhered to the surface of the hydrophilic core material particles; and heating for a time and temperature sufficient to cross link the deposited prepolymer on the surface of the particles.

In a further embodiment the present invention discloses a process for forming a population of microcapsules comprising a solid hydrophilic core material and a wall material at least partially surrounding the core material, the microcapsule population being formed by providing particles of a solid hydrophilic core material; providing an oil continuous phase which is low boiling and preferably nonflammable, the oil continuous phase comprising one or more hydrocarbons with chain length up to about 18 carbons; dividing the oil continuous phase into oil 1 and oil 2; dispersing into oil 1 an initiator; dispersing into oil 2 a multifunctional acrylate or methacrylate monomer or oligomer, and an oil soluble or dispersible acid acrylate or methacrylate, and a base; subjecting oil 1 to one or more heating steps; combining oil 1 an oil 2; subjecting the combined oils to one or more heating steps, forming an anionic wall prepolymer; forming a mixture by dispersing the solid hydrophilic material into the oil continuous phase and mixing for a time sufficient to allow the wall prepolymer to migrate to and deposit onto a surface of the solid hydrophilic core material particles; holding the temperature for a time sufficient to enable the anionic prepolymer to flow onto the coalesce into a continuous film surface coating on the hydrophilic core material; optionally adding a surfactant, and heating the mixture for a time sufficient to cross-link the deposited prepolymer continuous film surface coating on the particles.

Preferably in the foregoing embodiment, hydrocarbons of the oil continuous phase are esters.

Preferably the wall material is selected to be a water permeable, partially water permeable, water soluble, partially water soluble, water fracturable, water disintegratable, semi-porous or an osmotic material.

The oil continuous phase can comprise in addition sucrose octyl stearate, a polysaccharide, polyethylene glycol, esters of polyethylene glycol, esterified polyol, saccharide ester, or wax.

Optionally, if desired, a water soluble polymer can be added in addition to the multifunctional acrylate.

In the foregoing embodiments forming or crosslinking the prepolymers can be accomplished by heating the mixture or exposing the mixture to actinic radiation or both.

In the above embodiments the solid hydrophilic core material can be selected from the group consisting of anionic, cationic, or neutral but polar material. Preferably in the embodiments with base and acid acrylate or acid methacrylate, the base and acid acrylate or acid methacrylate have a percent by weight as compared to weight of the wall material of from 0.1 to 10 percent, or even from 0.1 to 20%, or even from 0.1 to 25%.

Optionally when base is employed in the embodiments, the base can be an amine acrylate or methacrylate.

In a further embodiment the invention discloses a population of microcapsules comprising a solid hydrophilic core material; a wall material at least partially surrounding the core material, the microcapsule wall material comprising a reaction product from within an oil continuous phase of i) an oil soluble or dispersible amine acrylate or methacrylate with ii) a multifunctional acrylate or methacrylate monomer or oligomer, and iii) a soluble acid and an initiator, wherein i), ii) and iii) are first dispersed in an oil continuous phase and subjected to one or more heating steps followed by the step of introduction of the solid core; wherein the oil continuous phase is low boiling and preferably nonflammable, the oil continuous phase comprising one or more hydrocarbons with chain length up to about 18 carbons; wherein the soluble acid and the amine acrylate are in a molar proportion from 3:1 to 1:3 and together have a percent by weight as compared to the weight of the wall material of from 0.1 to 20%, from 0.1 to 25%, or even from 0.1 to about 35%, whereby the reaction product results in the formation of a population of microcapsules having a hydrophobic microcapsule wall material at least partially surrounding a solid hydrophilic core material.

In a yet further embodiment the invention describes a population of microcapsules comprising a solid hydrophilic core material; a wall material at least partially surrounding the core material, the microcapsule wall material comprising a reaction product from within an oil continuous phase of i) an oil soluble or dispersible acid acrylate or methacrylate with ii) a multifunctional acrylate or methacrylate monomer or oligomer, and iii) a soluble base and an initiator, wherein i), ii) and iii) are first dispersed in an oil continuous phase and subjected to one or more heating steps followed by the step of introduction of the solid core; wherein the oil continuous phase is low boiling and preferably nonflammable, the oil continuous phase comprising one or more hydrocarbons with chain length up to about 18 carbons; wherein the soluble base and the acid acrylate are in a molar proportion from 3:1 to 1:3 and together have a percent by weight as compared to the weight of the wall material of from 0.1 to 20%, whereby the reaction product results in the formation of a population of microcapsules having a hydrophobic microcapsule wall material at least partially surrounding a solid hydrophilic core material.

DETAILED DESCRIPTION

The present invention discloses a population of microcapsules comprising solid hydrophilic core material, selected to be anionic, cationic or neutral but polar; a wall material at least partially surrounding the core material, the microcapsule wall material comprising a reaction product from within an oil continuous phase of i) an oil soluble or dispersible amine acrylate or methacrylate with ii) a multifunctional acrylate or methacrylate monomer or oligomer, and iii) a soluble acid and an initiator, wherein i) ii) and iii) are first dispersed in an oil continuous phase and mixed for a sufficient time to form a prepolymer which is allowed sufficient time to migrate to and deposit onto the solid hydrophilic core material.

The oil continuous phase is low boiling and preferably nonflammable, the oil continuous phase preferably comprises one or more hydrocarbons, preferably esters with chain length up to about 18 carbons. The soluble acid and the amine acrylate are preferably in a molar proportion from 3:1 to 1:3 and together preferably have a percent by weight as compared to the weight of the wall material of from 0.1 to 20%.

The particles of solid hydrophilic core material can be provided as particulates or precipitated from the continuous phase.

Multifunctional acrylate or methacrylate monomers or oligomers can include di-; tri-; tetra-penta-; hexa-; hepta-; or octa-functional acrylate esters, methacrylate esters and multifunctional polyurethane acrylate esters and epoxy acrylates stable in the presence of initiator. Monomers shall be understood as including oligomers thereof. Optionally, an inhibitor such as hydroquinone can be added to the monomer and initiator blend in the capsules to prevent premature polymerization.

Useful monomers in the invention are di-and poly-functional acrylate esters, difunctional (meth)acrylate esters, polyfunctional (meth)acrylate esters, difunctional urethane acrylate esters, polyfunctional urethane acrylate esters and polyfunctional and difunctional epoxy acrylate monomers and oligomers used alone or in combination as blends. In alternate embodiments, optionally, the di-and polyfunctional acrylates, methacrylates, urethane acrylates, and epoxy acrylates are further blended with monofunctional acrylates, methacrylates, urethane acrylates and epoxy acrylates.

In an aspect of the invention multi-functional acrylate or methacrylate monomers or oligomers preferably are selected to have a Tg>60° C., in one aspect greater than 70° C., and in another aspect greater than 80° C., and can include by way of illustration and not limitation, allyl methacrylate; triethylene glycol dimethacrylate; ethylene glycol dimethacrylate, diethylene glycol dimethacrylate, aliphatic or aromatic urethane diacrylates, difunctional urethane acrylates, ethoxylated aliphatic difunctional urethane methacrylates, aliphatic or aromatic urethane dimethacrylates, epoxy acrylates, epoxymethacrylates; tetraethylene glycol dimethacrylate; polyethylene glycol dimethacrylate; 1,3 butylene glycol diacrylate; 1,4-butanediol dimethacrylate; 1,4-butanediol diacrylate; diethylene glycol diacrylate; 1,6 hexanediol diacrylate; 1,6 hexanediol dimethacrylate; neopentyl glycol diacrylate; polyethylene glycol diacrylate; tetraethylene glycol diacrylate; triethylene glycol diacrylate; 1,3 butylene glycol dimethacrylate; tripropylene glycol diacrylate; ethoxylated bisphenol diacrylate; ethoxylated bisphenol dimethylacrylate; dipropylene glycol diacrylate; alkoxylated hexanediol diacrylate; alkoxylated cyclohexane dimethanol diacrylate; propoxylated neopentyl glycol diacrylate, trimethylolpropane trimethacrylate; trimethylolpropane triacrylate, pentaerythritol triacrylate, ethoxylated trimethylolpropane triacrylate, propoxylated trimethylolpropane triacrylate, propoxylated glyceryl triacrylate, ditrimethylolpropane tetraacrylate, dipentaerythritol pentaacrylate, ethoxylated pentaerythritol tetraacrylate.

Useful amines can include by way of illustration and not limitation amine modified vinyl monomers including amine modified acrylate or methacrylates such as mono or diacrylate amities, mono or dimethacrylate amines, amine modified polyetheracrylates and amine modified polyethermethacrylates, aminoalkyl acrylates or aminoalkyl methacrylate. Preferred are monofunctional amine acrylates or amine methacrylates such as aminoalkylacrylates or aminoalkylmethacrylates with a nitrogen content of 5% by weight or greater.

The amines can include primary, secondary or tertiary amities and can include tertiary butyl aminethylmethacrylate, diethylaminoethyl methacrylate, or dimethylaminoethyl methacrylate. Water soluble bases preferably include typical bases such as NaOH or KOH, but can include other typical oxides and hydroxides of metals and ammonia. The base optionally can comprise monofunctional amine acrylate or monofunctional amine methacrylate with a nitrogen content by weight of 5% or greater. Examples include alkylaminoacrylate and alkylaminomethacrylates.

The oil soluble acid is preferably an organic acid. The organic acid can be selected from various acids such as carboxy acids, with monoalkyl maleates such as monomethyl, monoethyl or monobutyl maleate being preferred, with monobutyl maleate being most preferred. Other preferred organic acids include beta-carboxyethyl acrylate. Yet other organic acids that can be usefully employed in the invention include, organic sulfonic acids such as alkyl benzene sulfonic acid, more particularly linear alkyl benzene sulfonic acid, tridecylbenzene sulfonic acid, more particularly linear trialkyl benzene sulfonic acid such as linear tridecyl benzene sulfonic acid, alkyldiphenyloxide sulfonic acid, preferably dodecyl diphenyl oxidedisulfonie acid, more particularly branched C12 diphenyl oxide disulfonic acid, alkylbenzene sulfonic acid, more particularly, dodecyl benzene sulfonic acid, dialkyl naphthalene disulfonic acid, more particularly dinonylnaphthalene disulfonic acid, 4-hydrozino benzene sulfonic acid acrylic acid, methacrylic acid, and the like. Desirably the organic acid is selected to be dispersible in the oil phase and sparingly soluble in the water phase. The organic acid is used as 0.1 to 20%, preferably 3 to 10.0%, and more preferably 5.0-7.0% by weight based on percentage of total wall. Useful acids also include standard strong acids such as HCl, $H_2SO_4$, and $H_3PO_4$. Acids are hydrogen ion source materials and can include mineral acids, solutions of hydrogen halides, and various materials that increase the concentration of hydrogen ions in solution. Optionally the acid can be carboxylic acid acrylate or carboxylic acid methacrylate having a —COOH content of 20% or greater by weight. Bases when employed include alkaline materials and can include materials that donate electrons or hydroxide ions or accept protons such as alkaline hydroxides including NaOH, NH4OH or KOH.

Excluding solvent, the primary, secondary or tertiary amine acrylate or methacrylate and the multi-functional acrylate or methacrylate monomers are used in a relative weight ratio of from about 0.1:99.9 to about 10:90 preferably from about 0.5:99.5 to about 5:95, and most preferably 1:99 to about 3:97.

Low molecular weight secondary or tertiary amines can be also employed as the amine provided they are oil soluble or dispersible.

Similarly in embodiments based on acid acrylate or methacrylate with multifunctional acrylates or methacrylate monomer, the acid acrylate or methacrylate and the multi-functional acrylate or methacrylate are in a relative weight ratio of from 0.1:99.9 to about 10:90 preferably from about 0.5:99.5 to about 5:95, and most preferably 1:99 to about 3:97.

The initiators are energy activated meaning generating free radicals when subjected to heat or other energy input. Preferred initiators include peroxy initiators, azo initiators, peroxides, and compounds such as 2,2'-azobismethylbutyronitrile, dibenzoyl peroxide. More particularly, and without limitation the free radical initiator can be selected from the group of initiators comprising an azo or peroxy initiator, such as peroxide, dialkyl peroxide, alkyl peroxide, peroxyester, peroxycarbonate, peroxyketone and peroxydicarbonate, 2,2'-azobis(isobutylnitrile), 2,2'-azobis(2,4-dimethylpentanenitrile), 2,2'-azobis(2,4-dimethylvaleronitrile), 2,2'-azobis(2-methylpropanenitrile), 2,2'-azobis(methylbutyronitrile), 1,1'-azobis (cyclohexanecarbonitrile), 1,1'-azobis(cyanocyclohexane), benzoyl peroxide, decanoyl peroxide; lauroyl peroxide; benzoyl peroxide, di(n-propyl)peroxydicarbonate, di(sec-butyl)peroxydicarbonate, di(2-ethylhexyl)peroxydicarbonate, 1,1-dimethyl-3-hydroxybutyl peroxyneodecanoate, α-cumyl peroxyneoheptanoate, t-amyl peroxyneodecanoate, t-butyl peroxyneodecanoate, t-amyl peroxypivalate, t-butyl peroxypivalate, 2,5-dimethyl 2,5-di (2-ethylhexanoyl peroxy)hexane, t-amyl peroxy-2-ethylhexanoate, t-butyl peroxy-2-ethylhexanoate, t-butyl peroxyacetate, di-t-amyl peroxyacetate, t-butyl peroxide, di-t-amyl peroxide, 2,5-dimethyl-2,5-di-(t-butylperoxy)hexyne-3, cumene hydroperoxide, 1,1-di-(t-butylperoxy)-3,3,5-trimethyl-cyclohexane, 1,1-di-(t-butylperoxy)-cyclohexane, 1,1-di-(t-amylperoxy)-cyclohexane, ethyl-3,3-di-(t-butylperoxy)-butyrate, t-amyl perbenzoate, t-butyl perbenzoate, ethyl 3,3-di-(t-amylperoxy)-butyrate, and the like. Blends of initiators can also be employed. Initiators are available commercially, such as Vazo initiators, which typically indicate a decomposition temperature for the initiator. Preferably the initiator is selected to have a decomposition point of about 50° C. or higher. Usefully multiple initiators are employed, either as a blend in the oil phase, or in either of the oil or water phases. Preferably initiators are selected to stagger the decomposition temperatures at the various steps, pre-polymerization, wall formation and hardening or polymerizing of the capsule wall material. For example, a first initiator in the oil phase can decompose at 55° C., to promote prepolymer formation, a second can decompose at 60° C. to aid forming the wall material. Optionally a third initiator can decompose at 65° C. to facilitate polymerization of the capsule wall material. The total amount of initiator can be typically as low as 0.1 weight percent or as high as 10 weight percent.

The oil continuous phase or oil phase used interchangeably for purposes hereof can be selected from hydrocarbons, more particularly hydrocarbon solvents and the solvents can include by way of illustration and not limitation, ethyldiphenylmethane, butyl biphenyl ethane, benzylxylene, alkyl biphenyls such as propylbiphenyl and butylbiphenyl, dialkyl phthalates e.g. dibutyl phthalate, dioctylphthalate, dinonyl phthalate and ditridecylphthalate; 2,2,4-trimethyl-1,3-pentanediol diisobutyrate, alkyl benzenes such as dodecyl benzene; alkyl or aralkyl benzoates such as benzyl benzoate; diaryl ethers, di(aralkyl)ethers and aryl aralkyl ethers, ethers such as diphenyl ether, dibenzyl ether and phenyl benzyl ether, liquid higher alkyl ketones (having at least 9 carbon atoms), alkyl or aralky benzoates, e.g., benzyl benzoate, alkylated naphthalenes such as dipropylnaphthalene, partially hydrogenated terphenyls; high-boiling straight or branched chain hydrocarbons, alkaryl hydrocarbons such as toluene, vegetable oils such as canola oil, soybean oil, corn oil, sunflower oil, or cottonseed oil, methyl esters of fatty acids derived from transesterification of canola oil, soybean oil, cottonseed oil, corn oil, sunflower oil, pine oil, lemon oil, olive oil, or methyl ester of oleic acid, vegetable oils, esters of vegetable oils, e.g. soybean methyl ester, straight chain saturated paraffinic aliphatic hydrocarbons of from 10 to 13 carbons. Mixtures of the above can also be employed. Common diluents such as straight chain hydrocarbons can also be blended with the solvents, or blend of solvents. The solvent is selected on the basis of hydrophobicity and ability to disperse or solvate the amine modified vinyl monomer and the multifunctional acrylate or methacrylate monomer or oligomer, and/or the acid acrylate.

Preferably the oil continuous phase comprises one or more esters with chain length of up to about 18 carbons. An example of such an oil continuous phase material is isoamylbenzoate, capric triglyceride, caprylic triglyceride or blends thereof.

Other preferred oil continuous phase material include $C_{16}$ to $C_{18}$ soy esters.

Lower carbon length esters can also be employed however care must be taken such as with $C_5$ to $C_8$ esters to minimize flammability such as using a nitrogen blanket.

In a preferred process the oil continuous phase is divided into two oils, oil 1 and oil 2. The initiator is dispersed in oil 1. Oil 1 and oil 2 can be the same or different. Preferably they are divided portions of the same oil. An initiator is dispersed in oil 1. Into oil 2 a multifunctional acrylate or methacrylate monomer or oligomer, an oil soluble amine acrylate or methacrylate and an acid is dispersed. Optionally the oil soluble amine acrylate or methacrylate is substituted with an acid acrylate or methacrylate and base. Oil 1 and oil 2 are combined. A solid hydrophilic material is dispersed into any of oil 1, oil 2 or the combined oils. "Dispersing the solid hydrophilic material into the oil continuous phase" is intended to encompass any or all of these variations.

Optionally a surfactant can be added, selected to have less charge than the solid hydrophilic material.

Also optionally the oil continuous phase comprises or is blended with a second material that influences properties of the finished wall material of the microcapsules. Such materials can change rheology, influence permeability, rate of disintegration, or porosity of the wall. Such optional materials for the oil continuous phase include sucrose octyl stearate, polysaccharides, polyethylene glycol, esters of polyethylene glycol, esterified polyol, saccharide ester or wax. Advantageously, a certain portion of such optional oil phase materials are carried with and incorporated in the microcapsule wall surrounding the solid hydrophilic core.

After the wall forming materials and solid hydrophilic core material are dispersed in the oil or oils of the continuous phase and/or oil 1 and oil 2 are combined, along with acid or base respectively depending on whether amine acrylate or methacrylate or acid acrylate or methacrylate is selected as wall forming materials, wall pre-reaction can be carried out by heat or light depending on the initiator employed. Optionally, oil 1 can be heated or subjected to light, depending on the initiator system used, to create a population of free radicals, prior to combining the two oil solutions for wall pre-reaction.

After wall pre-reaction, the oil solution is milled and heated or UV exposed for a sufficient time to allow wall deposition to proceed. This process is further illustrated and explained in the examples.

In an alternative embodiment, in the first composition, the initiator can be an energy-activated initiator, relying in place of heat or in addition to heat, on light such as a UV or light induced or electron beam induced free radical. Optionally a visible light induced free radical generator could also be used. This dispersion is then subjected to UV light to generate free radicals and initiate polymerization. Depending on the type of initiator or initiators, the dispersion is subjected to UV light and/or heated (as appropriate to the initiator or initiators) to generate free radicals. The term energy activated is intended to encompass heat, or light, UV or visible or infrared, or electron beam activation, without limitation.

As polymerization progresses induced by heat or light, microcapsule wall material prepolymer forms and is drawn to the interface of the solid hydrophilic particle and oil phases. The core material can be selected to be anionic, cationic, or neutral but polar. Preferably the prepolymer and wall material is oppositely charged or polar to facilitate migration to the hydrophilic core material. UV exposure and/or heating steps can be used to further polymerize or harden the formed wall material.

UV initiators can include ketone compounds and can include benzophenone; acetophenone; benzil; benzaldehyde; o-chlorobenzaldehyde; xanthone; thioxanthone; 9,10-anthraquinone; 1-hydroxycyclohexyl phenyl ketone; 2,2-diethoxyacetophenone; dimethoxyphenylacetophenone; methyl diethanolamine; dimethylaminobenzoate; 2-hydroxy-2-methyl-1-phenylpropane-1-one; 2,2-di-sec-butoxyacetophenone; 2,2-dimethoxy-1,2-diphenylethan-1-one; dimethoxyketal; and phenyl glyoxal.2,2'-diethoxyacetophenone; hydroxycyclohexyl phenyl ketone; alpha-hydroxyketones; alpha-amino-ketones; alpha and beta naphthyl carbonyl compounds; benzoin ethers such as benzoin methyl ether; benzyl; benzil ketals such as benzil dimethyl ketal; acetophenone; fluorenone, 2-hydroxy-2-methyl-1-phenylpropan-1-one. UV initiators of this kind are available commercially, e.g., IRGACURE 184™ or DEROCURE 1173™ from Ciba. Thermal initiators are available from DuPont. The fraction of the photo initiator in any of the water or oil phase is approximately from about 0.1 to 10%, preferably 0.25 to about 6% by weight, more preferably 0.5 to 2.5 weight percent. Similar weight percent ranges can also be applied to the thermal initiators.

UV initiators can be included in substitution as an alternate initiator system (for any heating step or steps of the encapsulation process, or as an additional initiator system). In a yet further embodiment, for specialized microencapsulation processes, the use of initiators, e.g., thioxanthones, phosphine oxides, metallocenes, tertiary aminobenzenes or tertiary aminobenzophenones, which break down into free radicals on exposure to visible light is effectively used. Such microencapsulation systems however typically require special handling of the system to prevent premature polymerization or oligomerization by appropriate control of lighting conditions.

This produces an initiator system for polymerization or oligomerization using a dual cure method or optional thermal or optional light or optional UV initiated method by appropriate selection of initiator and initiation method or methods. In an alternative embodiment of the invention, azo compounds that can be excited or split by UV light or high-energy radiation are used alone or in combination with thermal free radical initiators. In a yet alternative embodiment, the combination of thermal and UV initiators is formed only by azo compounds.

For light activated microencapsulation, the use of UV initiators are preferred, or a combination of UV initiators and thermal free radical initiators. This combination can impart considerable versatility to the microencapsulation steps of the process where any step or steps of the microencapsulation process then can be initiated either by appropriate selection of an initiator decomposing at specific temperatures or decomposing under specific light conditions. This versatility in the selection of initiators also allows sufficient flexibility in the encapsulation system to customize encapsulation conditions for a given core material. For example, highly volatile or heat-sensitive materials may be more effectively encapsulated with minimal heating, through the use of energy-cure methods.

In a yet further embodiment, with appropriate selection of monomers and initiators, the respective monomers in the process can be polymerized or oligomerized using some suitable means such as heat (used with thermal initiators) or UV light (for use with UV initiators), or electron beam. When replacing the UV radiation with electron beam, the addition of initiators is not absolutely essential or amounts employed can be reduced. Options for individual initiation steps of the encapsulation process include the freedom to use in replacement of any heating step, the use of visible light with suitable initiators, the use of UV light with suitable UV initiators, or ionizing radiation (e.g. electron beam or gamma ray) without initiators or reduced amounts of initiator.

UV initiators may be selected from those organic chemical compounds conventionally employed to promote UV-initiated formation of radicals. A preferred UV initiator is 1-hydroxycyclohexyl phenyl ketone because of the rapidity with which it generates free radicals when exposed to UV radiation. Mixtures of UV initiators or mixtures with thermal initiators may also be used. This is often desirable because it provides more efficient production of radicals in certain eases. In general, the UV initiator will be present in an amount of 0.1 to 10.0 weight percent in any of the water or oil phases, based on the total weight of all constituents. However, it is preferable to use between 0.25-2.5 weight percent UV initiator, most preferably 0.5-1.0 weight percent UV initiator, based on total weight.

The amount of each initiator, thermal, UV or light, that is employed can vary, and is dependent upon factors such as the monomer or oligomer material. Typically, the amount of initiator ranges from about 0.1 to about 6 percent, and often about 1 to about 3 percent, based on the weight of all constituents.

A process of microencapsulation based on UV curing has the advantage of allowing the encapsulation of highly volatile or heat sensitive core materials. UV curable wall systems can have lower energy usage than analogous thermal-cured systems. In certain aspects, a UV-curable system has the potential of increased throughput and efficiency through use of photo initiation.

Figure 1:
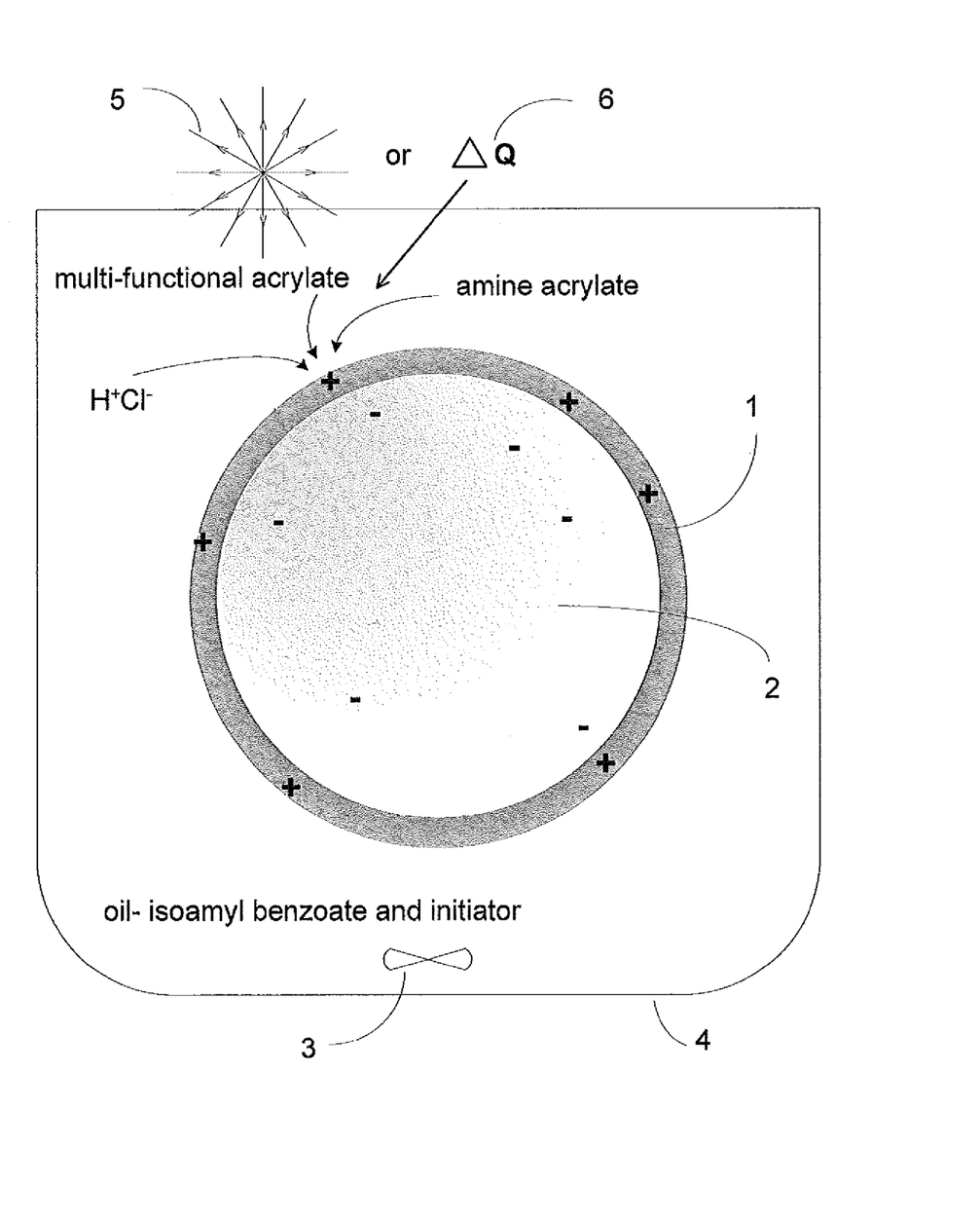
FIG. 1 is an illustration of one embodiment of microcapsules according to the invention.

Looking now at FIG. 1, reactor 4 is provided with impeller 3. Optionally, the reactor can be transparent to permit light passage. UV light source 5 is provided and ΔQ indicates a quantity of heat applied to the reactor slurry. The microcapsule is depicted in exaggerated size to help in illustration of the process. The microcapsule population is formed by providing anionic solid hydrophilic material 2. In an alternative embodiment charges can be the reverse by selecting a cationic, or even nonionic solid hydrophilic core. If nonionic, treating with surfactant may be necessary to drive wall material to the particle. Solid hydrophilic material 2 is dispersed and comminuted into the continuous phase oil shown in FIG. 1 as isoamyl benzoate along with an initiator, and preferably a thermal or actinic radiation free radical generator.

An amine acrylate and acid, when the solid hydrophilic particle is selected as anionic; or in the case when the solid hydrophilic particle is cationic, an acid acrylate and base; are added to and dispersed into the continuous phase oil. Optionally some surfactant can be added along with multifunctional acrylate and the solid hydrophilic core particles of desired size. The mixture is further milled if desired and comminuted to desired particle size. UV light radiation such as light source 5 is provided and/or heat quantity 6. In thermally initiated systems a ΔQ heat quantity may be sufficient. ΔQ can be provided in increments to pre-react the polymers and following acid (or base addition) to cure or harden the polymers or pre-polymers as they migrate to the surface of solid hydrophilic particle 2 to form wall material 1. In this embodiment wall material 1 is depicted as cationic or carrying a level of positive charge. In an alternative embodiment the charges can be reversed with the wall material being anionic and the solid hydrophilic particle being cationic.

Most solid hydrophilic particles will typically exhibit anionic character. Cationic hydrophilic particles include amino­functional polymers or resins.

The process and microcapsules according to the invention enable protection of water sensitive materials since the capsules do not come into contact with water during encapsulation. The capsule wall can also provide additional structure to slow release or until later disintegration. The capsule wall can also delay release as a function of wall permeability or provide for release by fracture, pressure, friction, heat, shock, sonics, scraping, and like mechanisms. Water soluble or partially water soluble capsule wall can provide release by dissolution. By release it is meant that the solid hydrophilic particle that is coated is able to be contacted by water, can contact the water, or can diffuse to the water, for example if the solid hydrophilic material is a gel-like material. Examples of core materials usefully encapsulated by the microcapsules and process of the invention include absorbents, adsorbents, sugars, aluminosilicates, molecular sieve materials, zeolites, and the like.

Layering of multiple layers onto the solid hydrophilic particles is also possible by repeated dispersion steps according to the invention. In such fashion hydrophilic and/or relative hydrophobic character can be customized in each layer to provide a membrane effect and/or to control relative observed charge on the external surface of the solid hydrophilic particle before encapsulation or to a customized configuration and charge after encapsulation.

The process of invention can be effectively used to encapsulate various solid hydrophilic materials including dessicated porous glasses, polyhedral alumina or titanic crystals, calcined silicas and silicates with pores with pores in the micrometer range, 0.1 to 110 microns, and preferably 0.25 to 20 micron pore size, ordered polymers, alumino silicates, a variety of microporous materials including metal silicas, zeolites, ceramics, alumina, titania, and even dessicated powdered steels. Other solid hydrophilic materials could include sugars, fumaric acid, calcium hydroxide, other solid carboxylic acids or solid bases, herbicides, pesticides, algaecides, fungicides, polysaccharides, dessicated microporous polymeric materials such as polymeric beads, laser inradiated polyimides or polycarbonates, nylon, polyvinylidene fluoride, cellulose acetate/nitrate, polysulfone, polypropylene, polyamide. Many of these types of materials and zeolites for example have an affinity for absorbing water. Encapsulation can be effectively utilized to preserve a dessicated condition until desired. These materials often exothermally release heat upon absorption of water. Encapsulation can be useful to control the rate of water uptake and/or control the rate of heat diffusion. Silicas and silicates are known for purposes of forming molecular sieves and other materials with a uniform pore structure. The uniformity of size of the pore structure of the membrane often is more important to the end use generally than the particular method of forming, molding, dissolving, etching, lasering, layering, calcining or other technique used to fashion the solid hydrophilic material.

The solid hydrophilic particles can be conditioned or emulsification enhanced either by adding a surfactant in the emulsification step or by conditioning the solid hydrophilic material by modifying the solid hydrophilic particles' relative hydrophilicity or altering its hydrophobicity.

For example, when aluminum silicas are used, it is possible to enhance the hydrophilicity of the surface on the external side of the particle. An optional acid soak, though not required, may be applied with aluminum silicates to enhance hydrophilicity. Other treatments can include applying a sol gel of fluoralkoxides of elements of group IIA in an organic solvent, followed by hydrolysing and washing away of any soluble salts. Dessicating following such treatments may be needed before emulsification in the process of the invention.

Surfactants useful in the invention can also be used as a treatment of the particles prior to emulsification and prior to dispersion in the continuous phase oil. Hydrophillic character can be increased by treating with surfactants such as sodium dodecyl sulfate or sodium dodecylbenzene sulfate. For modifying relative hydrophobicity, cationic surfactants such as cetyl trimethylammonium bromide can be used. Hydrophobicizing glass membrane particles can be accomplished through chemical absorption on the membrane of a hydrophobic film such as dimethylpolysiloxane, silicone oils, methyltrimethylsilane, isopropyltristearyltitanote and the like as taught in Japanese Laid Open Patent Application (Kokai) No. 5 [1993]-240 Application No. 3 [1991]-153126 by Osaka Glass Co. (" " Manufacture of Inorganic Uniform Microspheres." Silanation advantageously can produce more long lasting hydrophobic conditioning.

Encapsulation of hydrophilic solid with acrylate-wall

EXAMPLE 1

| Oil 1: 450 grams isoamyl benzoate | Oil 2: 50 grams isoamylbenzoate |
|---|---|
| 1 g Vazo-52 | 0.5 g conc. HCl |
| 0.5 g Vazo-67 | 10 g SR 206 ethyleneglycol dimethacrylate |
| | 1 g TBAEMA t-butylaminoethyl methacrylate |
| | Core: 100 g calcined clay |

Oil 1 added to steel jacketed reactor with N2 blanket on at 300 cc/min and mixing at 1500 rpm (4-tip flat mill). Oil heated from 35° C. to 75° C. in 45 minutes and held at 75° C. for 35 minutes. Oil 1 is cooled to 55° C. in 75 minutes. Oil 2 is added at 55° C., and combined oils mixed at 55° C. for 75 minutes. 100 g Ansilex clay added with mixing at 1000 rpm. Rpm is increased to 3000 for one hour of milling, then rpm decreased to 2500 for duration of heating cycle. The batch was heated to 75° C. and held at 75° C. for 4 hours and 90° C. for 8 hours. While not bound by theory, wall deposition would occur during the 55° C. heating step while continuing in the 75° C. heating step. Wall coalescence and surface coating occurs primarily in the 75° C. heating step along the early stages of cross-linking. The 90° C. heating step cross-links the deposited and coalesced polymeric particle coating. The resultant slurry is fluid with discrete encapsulation particles observable.

EXAMPLE 2

The encapsulation process according to Example 1, except using 2 g TMAEMA, and 100 g powdered sugar for the core. The resultant slurry is fluid with discrete encapsulation particles observable.

EXAMPLE 3

| Oil 1: 150 grams caprylic/capric triglyceride | Oil 2: 50 g caprylic/capric triglyceride |
|---|---|
| 1 g Vazo-52 | 0.5 g conc. HCl |
| 0.5 g Vazo-67 | 10 g CN975 Urethane acrylate oligomer |
| | 1 g TBAEMA |
| | Core: 100 g fumaric acid |

The process of Example 1 was followed to prepare microcapsules with the corresponding substitutions in the ingredients noted above.

EXAMPLE 4

The process according to Example 1, was followed except 50 g calcium hydroxide is used for the core.

EXAMPLE 5

| Oil 1: 200 grams isoamyl benzoate | Oil 2: 50 grams isoamyl benzoate |
|---|---|
| 0.5 g Vazo-52 | 0.5 g TBAEMA |
| | 0.5 g Beta-C |
| | 10 g CN975 |
| | Core: 50 g powdered sugar |

Oil 1 is added to a 35° C. glass jacketed reactor with a nitrogen blanket on at 100 cc/minute and with mixing at 400 rpm with a 1.5" propeller. The oil is heated to 75° C. in 45 minutes, hold at 75° C. for 35 minutes, and cool to 55° C. in 75 minutes. Oil 2 is added and the combined oils are held at 55° C. for 70 minutes then cooled to 25° C. in 75 minutes. The core is added at 25° C. and is mixed at 500 rpm. A photoinitiator (Irgacure 651, 0.5 g) is added 85 minutes after the core addition, and a UV light is applied 90 minutes after the core addition. The UV light is applied for 8 hours, and results in a low viscosity encapsulated solid suspension.

Unless otherwise indicated, all measurements herein are on the basis of weight and in the metric system. All references cited herein are expressly incorporated herein by reference.

The abbreviations correspond to the following materials:

| | Company/City | |
|---|---|---|
| SR206 | Sartomer Company, Exton, PA | Ethyleneglycol dimethacrylate |
| CN975 | Sartomer Company, Exton, PA | Hexafunctional Aromatic Urethane Acrylate Oligomer |
| TBAEMA | | Tertiarybutyl Aminoethyl Methacrylate |
| Vazo-52 | DuPont, Wilmington, DE | 2,2'-Azobis (2,4-Dimethylvaleronitrile) |
| Vazo-67 | DuPont, Wilmington, DE | 2,2'-Azobis (2-Methylbutyronitrile) |
| Vazo-68WSP | DuPont, Wilmington, DE | 4,4'-Azobis (4-Cyanovaleric Acid) |
| Irgacure 651 | CIBA, Tarrytown, NY | 2,2-Dimethoxy-1,2-Diphenylethan-1-one |
| Darocure 1173 | CIBA, Tarrytown, NY | 2-Hydroxy-2-Methyl-1-Phenyl-Propane-1-one |
| IAB | | isoamyl benzoate |
| Captex 355 | ABITEC Corporation, Columbus, OH | Caprylic/Capric Triglyceride |
| Beta-C | Bimax, Glen Rock, PA | Beta-carboxyethyl acrylate |
| Irgacure 651 | CIBA, Tarrytown, NY | 2,2-Dimethoxy-1,2-Diphenylethan-1-one |

All documents cited in the specification herein are, in relevant part, incorporated herein by reference for all jurisdictions in which such incorporation is permitted. The citation of any publication is for its disclosure prior to the filing date and should not be construed as an admission that such publication is prior art or that the present invention is not entitled to antedate such publication by virtue of prior invention. To the extent that any meaning or definition of a term in this document conflicts with any meaning or definition of the same term in a document incorporated by reference, the meaning or definition assigned to that term in this document shall govern.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Uses of singular terms such as "a," "an," are intended to cover both the singular and the plural, unless otherwise indicated herein or clearly contradicted by context. The terms "comprising," "having," "including," and "containing" are to be construed as open-ended terms. Any description of certain embodiments as "preferred" embodiments, and other recitation of embodiments, features, or ranges as being preferred, or suggestion that such are preferred, is not deemed to be limiting. All methods described herein can be performed in any suitable order unless otherwise indicated herein or otherwise clearly contradicted by context. The use of any and all examples, or exemplary language (e.g., "such as") provided herein, is intended to illuminate the invention and does not pose a limitation on the scope of the invention. No unclaimed language should be deemed to limit the invention in scope. Any statements or suggestions herein that certain features constitute a component of the claimed invention are not intended to be limiting unless reflected in the appended claims.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for forming a population of microcapsules comprising a solid hydrophilic core material and a wall material at least partially surrounding the core material, the microcapsule population being formed by:
   providing particles of a solid hydrophilic core material;
   providing an oil continuous phase which is low boiling, the oil continuous phase comprising one or more hydrocarbons with chain length up to about 18 carbons;
   dividing the oil continuous phase into oil 1 and oil 2;
   dispersing into oil 1 an initiator;
   dispersing into oil 2 a multifunctional acrylate or methacrylate monomer or oligomer, and an oil soluble or dispersible amine acrylate or methacrylate, and an acid;
   subjecting oil 1 to one or more heating steps;
   combining oil 1 and oil 2;

subjecting the combined oils to one or more heating steps, forming a cationic wall prepolymer;

forming a mixture by dispersing the solid hydrophilic material into the oil continuous phase and mixing for a sufficient time to allow the wall prepolymer to migrate to and deposit onto the solid hydrophilic core material particles;

optionally adding a surfactant;

holding the temperature for a time sufficient to enable the cationic prepolymer to flow and coalesce into a continuous film surface coating on the hydrophilic core material;

heating the mixture for a time sufficient to cross-link the deposited prepolymer continuous film surface coating on the surface of the particles.

2. The process of forming a population of microcapsules according to claim 1 wherein the acid and amine acrylate or methacrylate have a percent by weight as compared to weight of the wall material of from 0.1 to 25 percent.

3. The process of forming a population of microcapsules according to claim 1 wherein the weight ratio of amine to the multifunctional acrylate or methacrylate is from 0.1:99.9 to 10:90.

4. The process of forming a population of microcapsules according to claim 1 wherein the acid and amine acrylate or methacrylate have a molar proportion of from 1.5/1 to about 1/1.5.

5. The process of forming a population of microcapsules according to claims 1 wherein the solid hydrophilic core material is selected from the group consisting of anionic, cationic, or neutral but polar material.

6. The process of forming a population of microcapsules according to claim 1 wherein the amine acrylate or methacrylate is selected from a monofunctional amine acrylate or a monofunctional amine methacrylate with a nitrogen content of 5% by weight or greater.

7. The process of forming a population of microcapsules according to claim 1 wherein the amine acrylate is selected from the group consisting of alkyl amino acrylate and alkylaminomethacrylate having a nitrogen content of 5% by weight or greater.

8. The process of forming a population of microcapsules according to claim 1 wherein the acid is a carboxylic acid acrylate or carboxylic acid methacrylate having a —COOH content of 20% or greater by weight.

9. A process for forming a population of microcapsules comprising a solid hydrophilic core material and a wall material at least partially surrounding the core material, the microcapsule population being formed by:

providing particles of a solid hydrophilic core material;

providing an oil continuous phase which is low boiling, the oil continuous phase comprising one or more hydrocarbons with chain length up to about 18 carbons;

dividing the oil continuous phase into oil 1 and oil 2;

dispersing into oil 1 an initiator;

dispersing into oil 2 a multifunctional acrylate or methacrylate monomer or oligomer, and an oil soluble or dispersible acid acrylate or methacrylate, and a base;

subjecting oil 1 to one or more heating steps;

combining oil 1 and oil 2;

subjecting the combined oils to one or more heating steps, forming an anionic wall prepolymer;

forming a mixture by dispersing the solid hydrophilic material into the oil continuous phase and mixing for a time sufficient to allow the wall prepolymer to migrate to and deposit onto a surface of the solid hydrophilic core material particles;

optionally adding a surfactant, holding the temperature for a time sufficient to enable the anionic prepolymer to flow onto and coalesce into a continuous film surface coating on the hydrophilic core material;

heating the mixture for a time sufficient to cross-link the deposited prepolymer continuous film surface coating on the particles.

10. The process according to claim 1 or 9 wherein the hydrocarbons of the oil continuous phase are esters.

11. The process according to claim 1 or 9 wherein the wall material is selected to be a water permeable, partially water permeable, water soluble, partially water soluble, water fracturable, water disintegratable, semi-porous or an osmotic material.

12. The process according to claims 1 or 9 wherein the oil continuous phase comprises in addition sucrose octyl stearate, a polysaccharide, polyethylene glycol, esters of polyethylene glycol, esterified polyol, saccharide ester, or wax.

13. The process according to claims 1 or 9 wherein a water soluble polymer is added in addition to the multifunctional acrylate.

14. The process of forming a population of microcapsules according to claims 1 or 9 wherein the oil continuous phase is selected from the group consisting of isoamyl benzoate, capric triglyceride, caprylic triglyceride and blends thereof.

15. The process of forming a population of microcapsules according to claim 1 or 9 wherein forming or crosslinking the prepolymers is accomplished by heating the mixture or exposing the mixture to actinic radiation or both.

16. The process of forming a population of microcapsules according to claim 9 wherein the base is selected from the group consisting of monofunctional amine acrylate or a monofunctional amine methacrylate with a nitrogen content of 5% by weight or greater.

17. The process of forming a population of microcapsules according to claim 9 wherein the base is selected from the group consisting of alkyl amino acrylate and alkylaminomethacrylate having a nitrogen content of 5% by weight or greater.

18. The process of forming a population of microcapsules according to claim 9 wherein the acid acrylate or methacrylate is a carboxylic acid acrylate or carboxylic acid methacrylate having a —COOH content of 20% or greater by weight.

19. The process of forming a population of microcapsules according to claim 9 wherein the solid hydrophilic core material is selected from the group consisting of anionic, cationic, or neutral but polar material.

20. The process of forming a population of microcapsules according to claim 9 wherein the base and acid acrylate or methacrylate have a percent by weight as compared to weight of the wall material of from 0.1 to 25 percent.

* * * * *